Figure 1:
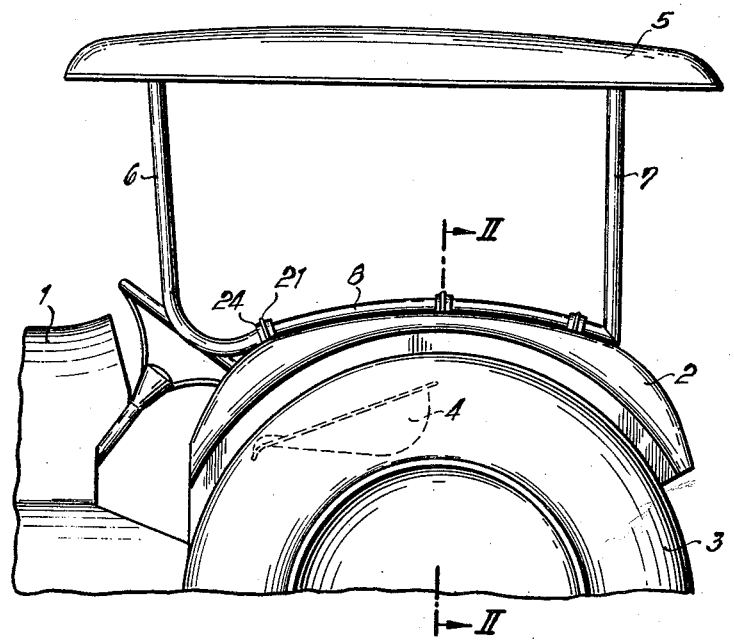

Dec. 25, 1962  E. KOMENDA  3,070,401
TRACTOR CONSTRUCTION
Filed Sept. 15, 1960

INVENTOR
Erwin KOMENDA

BY Dicke, Craig & Freudenberg
ATTORNEYS

United States Patent Office 3,070,401
Patented Dec. 25, 1962

3,070,401
TRACTOR CONSTRUCTION
Erwin Komenda, Stuttgart, Germany, assignor to Firma Dr. Ing. h. c. F. Porsche K.G., Stuttgart-Zuffenhausen, Germany
Filed Sept. 15, 1960, Ser. No. 56,291
Claims priority, application Germany Sept. 25, 1959
10 Claims. (Cl. 296—102)

The present invention relates to a tractor, especially an agricultural tractor provided with a roof which is secured at the fenders of the vehicle by means of supports or struts.

Roof structures are known in the prior art which are supported at the fenders of the tractor by means of brackets. This more or less pointwise support requires an additional reinforcement of the fender, especially in the form of large-surfaced bearing plates for the brackets which plates are predominantly rigidly connected with the fenders. During operations which can be or normally are carried out with the tractor without roof, these structural parts constitute an obstruction to the operator and form a source of danger for injuries.

In contrast thereto, the present invention provides a construction in which supports or struts for the roof are connected with extensions angularly disposed with respect thereto which abut or rest at the fender over a length amounting to a multiple of the width thereof and are preferably detachably secured thereat. As a result thereof, a relatively large-surfaced abutment of the roof structure at the fender is achieved whereby the latter may be of more light-weight construction by reason of the reduced specific stress to which the same is subjected. The securing of the support in accordance with the present invention may also be realized without any difficulties since a relatively long surface is available for the accommodation of an arrangement, for example, of a simple strap-like member or bow-shaped member.

The roof in accordance with the present invention is provided thereby on each vehicle side with two supports or struts the free ends of which are connected or secured with a bow-shaped member conforming to the contour of the fender and resting thereupon. The forward support or strut as viewed in the driving direction of the tractor is thereby provided with a bow-shaped member made in one piece therewith which extends essentially horizontally to the rear support or strut and is connected with the latter. The fastening of the roof at the fender takes place by the interposition of elastic elements.

Accordingly, it is an object of the present invention to provide a roof support structure for tractors, preferably a detachable roof support structure which obviates the disadvantages or inconveniences of the prior art constructions.

It is another object of the present invention to provide a roof support structure for tractors by means of which the roof is securely and reliably supported on the fenders of the tractor without the need of special support brackets or bearing plates that are a constant source of danger for injuries and that cannot be removed readily when tractor operations are undertaken which do not require the roof.

Still another object of the present invention resides in the provision of a roof support structure for a tractor by means of which the roof is supported on the fenders of the tractor in such a manner that the specific stress on the fenders is reduced whereby the fenders may be designed of relatively more light-weight construction.

A still further object of the present invention resides in the provision of a support arrangement for the roof on the fenders of a tractor which provides a relatively long abutment surface and which may be readily secured to and removed from the fenders.

Figure 2:
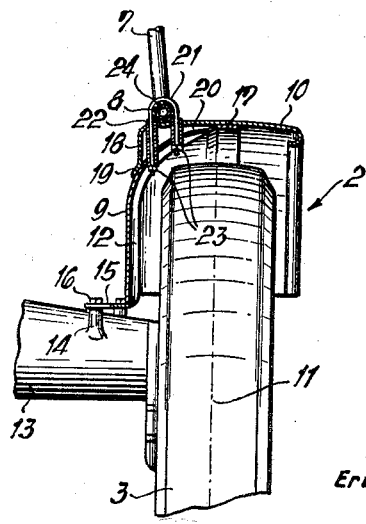

These and other objects, features and advantages of the present invention will become more obvious from the following description when taken in connection with the accompanying drawing which shows, for purposes of illustration only, one embodiment in accordance with the present invention, and wherein FIGURE 1 is a partial side elevational view of a tractor provided with a roof support in accordance with the present invention, and FIGURE 2 is a cross-sectional view taken along line II—II of FIGURE 1.

Referring now to the drawing, wherein like reference numerals are used throughout the two views to designate corresponding parts, and more particularly to FIGURE 1, reference numeral 1 designates therein a tractor of any suitable construction which is provided with rear wheels 3 covered by means of fenders 2. A seat 4 is arranged between the two fenders 2 for the rear wheels 3. For protecting the driver against climatic influences, the tractor 1 is provided with a roof 5 which is supported on each side of the vehicle at the fenders 2 by means of supports or struts 6 and 7. The forward support 6, as viewed in the driving direction, thereby includes a bow-shaped member 8 made in one piece therewith or formed integrally therewith which extends up to the rear support 7 and is connected with the latter, for example by welding. The bow-shaped member 8 is conformed in its configuration to the contours of the fender 2 and rests thereon.

The fender, generally designated by reference numeral 2, is made of two stamped or pressed-out sheet-metal fender parts 9 and 10 (FIGURE 2). The fender part 9 is thereby stamped or pressed-out as a shell-type structure with a dish-like shape and shields the rear wheel 3 essentially up to the center plane 11 thereof. The pressed-out fender part 9 is provided along the side thereof facing the wheel 3 with several ribs 12 which make it possible to utilize this pressed-out part 9 as a dish-like shell-type fender construction. Fastening of the dish-like fender part 9 takes place at the rear axle member 13. The latter is provided with bearing lugs 14 on which rests a plate 15 welded to the pressed-out fender part 9 which is retained in the desired position thereof by means of bolt members 16 engaging into threaded bores provided in the bearing lugs 14.

The other pressed-out part 10 of the fender 2 is constructed of essentially channel shape and serves to complete the dish-like fender part, constituted by the pressed or stamped part 9, into a box-type fender. The fastening of the pressed-out fender part 10 at the pressed-out fender part 9 takes place at the free end 17 of the fender part 9, within the region of the rear-wheel center plane 11. This may be done in any suitable manner, for example, by welding. Additionally, the pressed-out fender part 10 is provided with a web portion 18 angularly bent toward the pressed-out fender part 9 which abuts with the flange 19 thereof at the pressed-out fender part 9 and is suitably connected, for example, by spot-welding with the pressed-out fender part 9.

A hollow bearer member 20 of box-shaped cross section is formed by the parts 9, 10 and 18 of the fender within the area in which the bow-shaped member 8 of the roof 5 rests on the fender 2. Fastening of the bow-shaped member 8 takes place by means of a clamp 21 which is guided within sleeves 22 inserted into the pressed-out fender parts 9 and 10 within the region of the bearer member 20 and suitably secured thereto by welding.

The bow-shaped member 8 is thereby retained at the fender 2 by the interposition of an elastic insert 24 (FIGURE 1), preferably consisting of rubber. The clamp 21 is secured at the fender 2 by means of nuts 23 or the like (FIGURE 2).

The bow-shaped member 8 may also be retained by several clamps 21 distributed over the fender 2.

While I have shown and described one embodiment in accordance with the present invention, it is understood that the same is not limited thereto but is susceptible of many changes and modifications within the spirit and scope of the present invention; for example, other types of fastening means for the bow-shaped member 8 may also be provided, and I, therefore, do not wish to be limited to the details shown and described herein, but intend to cover all such changes and modifications as are encompassed by the scope of the appended claims.

I claim:

1. A tractor, especially an agricultural tractor, comprising oppositely disposed fenders, each of said fenders comprising two superposed parts, said superposed parts including spaced wall portions forming a hollow bearer member, roof means, and support means for supporting said roof means at said fenders including two support members interconnected by a bow-shaped member on each side of the vehicle, said bow-shaped member being angularly disposed with respect to said support members and resting on a respective hollow bearer member over a length amounting to a multiple of the width thereof, said bow-shaped member conforming to the uppermost contour of said hollow bearer member, and detachable means for securing said bow-shaped member on said hollow bearer member.

2. A tractor, especially an agricultural tractor, according to claim 1, wherein said fenders and said support means constitute the sole means for support of said roof means.

3. A tractor, especially an agricultural tractor, according to claim 1, wherein the forward support member as viewed in the driving direction of the tractor is formed integrally with said bow-shaped member and is welded with the bow-shaped member to the rear support member.

4. A tractor, especially an agricultural tractor, according to claim 3, wherein said detachable means includes elastic elements interposed between said bow-shaped member and the said respective hollow bearer member.

5. A tractor, especially an agricultural tractor, according to claim 1, wherein said detachable means comprises a clamp partially surrounding said bow-shaped member and having legs extending through said hollow bearer member.

6. A tractor, especially an agricultural tractor, according to claim 5, wherein said detachable means includes sleeves inserted into said hollow bearer member and surrounding said legs.

7. A tractor, especially an agricultural tractor, according to claim 6, wherein said detachable means includes nuts threaded on said legs and engaging said sleeves.

8. A tractor, especially an agricultural tractor, according to claim 1, wherein the lowermost of said superposed parts comprises a dish-shaped member provided with reinforcing ribs on the interior thereof.

9. A tractor, especially an agricultural tractor, according to claim 8, wherein said dish-shaped bearer member is supported by the rear axle of said tractor and means securing said dish-shaped member to said axle.

10. A tractor, especially an agricultural tractor, according to claim 1, wherein spaced fastening means are provided for fastening together said superposed parts, said bow-shaped member being disposed intermediate said spaced fastening means.

References Cited in the file of this patent

UNITED STATES PATENTS

| | | |
|---|---|---|
| 485,610 | Cool | Nov. 8, 1892 |
| 980,742 | Bartholomew | Jan. 3, 1911 |
| 1,556,529 | Logemann | Oct. 6, 1925 |
| 1,825,344 | Fageol | Sept. 29, 1931 |
| 2,073,058 | Greene | Mar. 9, 1937 |
| 2,256,890 | Brown et al. | Sept. 23, 1941 |
| 2,774,610 | Ratcliffe | Dec. 18, 1956 |

FOREIGN PATENTS

| | | |
|---|---|---|
| 406,892 | France | Dec. 17, 1909 |
| 821,326 | Great Britain | Oct. 7, 1959 |